United States Patent [19]
Reed et al.

[11] Patent Number: 6,148,211
[45] Date of Patent: *Nov. 14, 2000

[54] METHOD AND SYSTEM FOR ESTIMATING A SUBSCRIBER'S LOCATION IN A CLUTTERED AREA

[75] Inventors: John Douglas Reed; Shu-Shaw (Peter) Wang, both of Arlington, Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,151

[22] Filed: Sep. 5, 1997

[51] Int. Cl.⁷ ........................................ H04Q 7/20
[52] U.S. Cl. .................... 455/456; 455/422; 455/457; 342/357
[58] Field of Search .................... 455/11.1, 67.6, 455/404, 422, 427, 456, 457; 342/357, 453, 457; 701/300

[56] References Cited

U.S. PATENT DOCUMENTS

| | | | |
|---|---|---|---|
| 5,218,367 | 6/1993 | Sheffer et al. | 455/404 |
| 5,299,132 | 3/1994 | Wortham | 455/404 |
| 5,600,706 | 2/1997 | Dunn et al. | 455/456 |
| 5,602,903 | 2/1997 | LeBlanc et al. | 455/456 |
| 5,623,429 | 4/1997 | Fortune et al. | 455/67.6 |
| 5,673,305 | 9/1997 | Ross | 455/457 |
| 5,732,354 | 3/1998 | MacDonald | 455/456 |
| 5,742,666 | 4/1998 | Alpert | 455/404 |

OTHER PUBLICATIONS

Internet web page describing RadioCamera™ made by U.S. Wireless Corporation, "Labyrinth Communications Group, Inc.".

*Primary Examiner*—Nay Maung
*Attorney, Agent, or Firm*—L. Bruce Terry

[57] ABSTRACT

In a model of a wireless communication system service area (160), a set of characteristics associated with the reception of a model signal (210) are calculated (308), preferably using ray-tracing techniques, wherein the model signal (172) is transmitted from a selected location (162) to a receiver location (166). Next, a set of characteristics that describe a received signal at a receiver location in the wireless communication system service area are measured (316), wherein the receiver location corresponds to the receiver location in the model (160). Thereafter, a relationship between the calculated set of characteristics and the measured set of characteristics is determined (318), and the location of the subscriber unit that transmitted the received signal is estimated (320) in response to the relationship between the calculated set of characteristics and the measured set of characteristics.

30 Claims, 6 Drawing Sheets

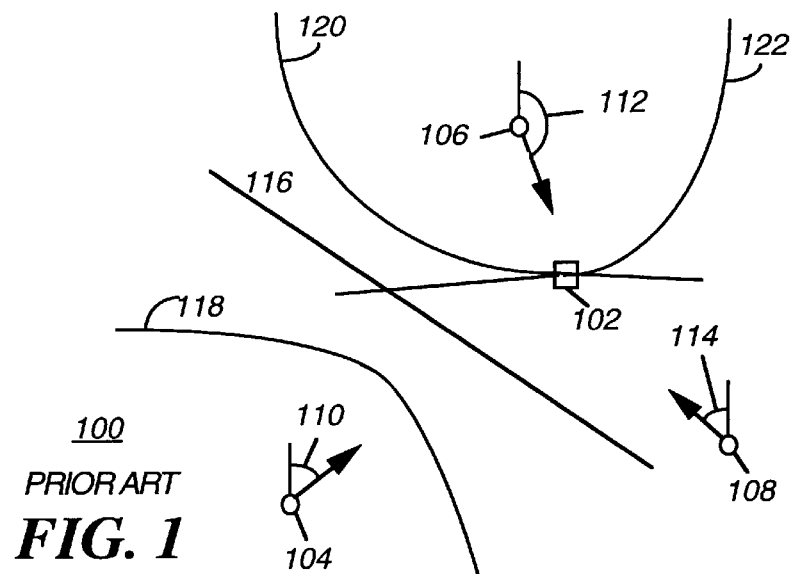
PRIOR ART
FIG. 1
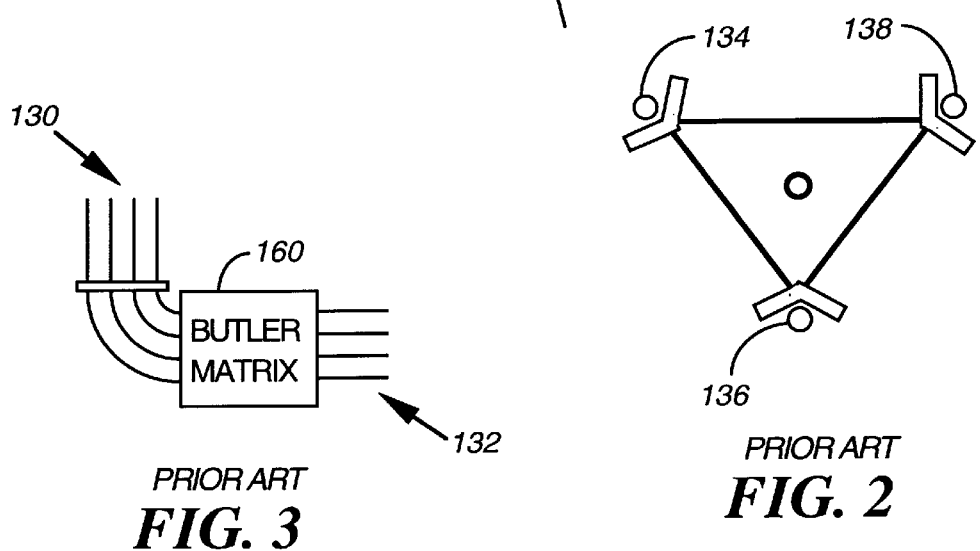
PRIOR ART
FIG. 3
PRIOR ART
FIG. 2
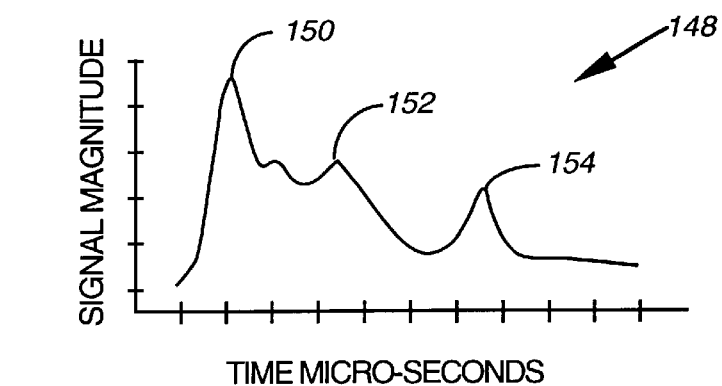
PRIOR ART
FIG. 4

FIG. 7

| LOCATION (TILE) | X (m) | Y (m) | TOF1 (μS) | AOA1 (deg) | RSS1 (dBm) | TOF2 (μS) | AOA2 (deg) | RSS2 (dBm) | TDOA12 (μS) | RSSD12 (dBm) | ... |
|---|---|---|---|---|---|---|---|---|---|---|---|
| 1 | -230 | 980 | 4.3 | 95 | -88 | 4.5 | 18 | -79 | -0.2 | 7 | ... |
| 1 | | | 4.8 | 115 | -91 | | | | | | ... |
| 2 | ... | | | | | | | | | | |
| ... | | | | | | | | | | | |
| n | ... | | | | | | | | | | |

METHOD AND SYSTEM FOR ESTIMATING A SUBSCRIBER'S LOCATION IN A CLUTTERED AREA

FIELD OF THE INVENTION

This invention relates in general to communication systems and, in particular, to a method of estimating a subscriber's location within a communications system.

BACKGROUND OF THE INVENTION

In a wireless communication system it is often desirable to locate users who are making calls. Applications for such a technology would include locating subscribers requesting 911-emergency services, so that police/fire/ambulance services could be dispatched to a user making a call. Other applications include cellular fraud detection, police investigations, and the like.

Previous cellular systems lacked sufficient resolution or accuracy to implement these applications. For example, in AMPS (Advanced Mobile Phone System) Cellular Radio, a user could be located within a cell by determining which base station antenna was used to serve the user. However a cell could be as large as 3–5 miles in radius, making this information practically useless for locating the subscriber. In addition, if the best serving base station is not the closest base, the possible range of locations for the subscriber may be even larger, and thus much less precise. Therefore, this method is not sufficient for most purposes.

Since many of the dense urban cell sites are now much smaller in radius, and many of the urban/suburban cell sites are now sectorized, the use of sectored antennas limits a channel's service area to just one sector, or portion of a cell, which significantly reduces the distinguishable coverage areas within a cell. However, the area even in these smaller sectors or cells can still be more than one square mile, and the closest cell still may not be best serving cell, thus introducing uncertainty, and making this method of location finding of little practical use. Other radio systems like US Digital Cellular (USDC) and (Group Speciale Mobile (GSM) use this same method of identifying the cell or sector, and thus may do no better than the AMPS system.

While there are other location finding alternatives, such as the use of Global Positioning System (GPS) units at the subscriber unit, these typically increase size, weight, and battery drain, and are thereby too costly to be used by most subscribers.

Another known method of finding location is to locate a subscriber unit at known locations throughout the coverage area of the cellular system while the base stations record signal characteristics associated with the received signals. These characteristics are then stored in a database along with the location previously recorded at the time the measurements were made. The "known location" may be determined with a GPS receiver. Later, when radio signals with similar characteristics are measured again by the base station, the location in the database with the closest match is assumed to be the location of the user.

This method suffers from a number of problems. First, locations in the database are limited to the locations that were measured, wherein such measurements may have been taken by driving or walking through the coverage area. It is difficult to drive an area and take enough measurements to have an accurate database for finding a location with a useful resolution. To get location finding resolutions down below 100 feet, a fine grid of locations must be measured, including both sides of the street, parking lots, pedestrian walkways, parks, and more.

And second, even if it was possible to measure all the important areas, small changes to a cell site configuration or location would require remeasuring all the locations in the area. Adding a new building in the service area, or erecting some other structure that affects signal propagation, would also require remeasuring all locations to recalibrate the system.

Thirdly, the GPS measurements must be highly accurate. If tall buildings are present in the GPS measurement area, even the best GPS measurement augmented by differential correction is not accurate enough to locate the user with the required resolution. Measurements taken in dense urban environments (i.e., in locations surrounded by tall buildings or other structures that block GPS signal reception) often have significant errors, erroneously locating the user on an adjacent street, or inside buildings, etc.. Thus, methods that rely exclusively on actual base station measurements are quite difficult to implement in practice, and are prone to errors that limit the accuracy of these methods.

Other location-finding methods have been proposed and demonstrated in an AMPS phone system, wherein the time difference of arrival of a signal transmitted from a subscriber and received at two or more base stations is measured. Locations corresponding to constant time differences between arriving signals may be plotted in a model of the coverage area as a set of hyperbolas—a set of points 116–122 (see FIG. 1) that define possible locations of the subscriber. If three sites can measure the signal from the subscriber and determine a time difference of arrival between each, then three time differences, representing three hyperbolas can be estimated. At least two time differences are needed to estimate a location. Reference numerals 120 and 122 illustrate lines of constant time difference intersecting at a point 102, representing the location of the subscriber. U.S. Pat. No. 5,317,323 to Kennedy, et al. describes the combined use of time difference of arrival and angle of arrival to obtain an improved location estimate when the measurement process is imprecise or unstable.

Referring now to FIG. 1, there is depicted a wireless communication system service area 100. As illustrated, subscriber unit 102 is located in the midst of base station antennas 104, 106, and 108. Angles of arrival for signals received at base station antennas 104, 106, and 108 are shown at reference numerals 110, 112, and 114, respectively. Locations in wireless communication service area 100 having a constant time difference of arrival may be shown as hyperbolas, such as hyperbolas 116, 118, 120, and 122. For example, hyperbolas 116, 118, and 120 represent three distinctly different time differences measured between sites 104 and 106. At any point on these lines, the time difference between the propagation delay (or time of flight (TOF)) to antenna 104 and the propagation delay to antenna 106 is a constant. Thus, considering time difference of arrival alone, a subscriber unit may be at any point on the line corresponding to a certain time difference measurement.

Similarly, hyperbola 122 represents another time difference contour measured between sites 106 and 108. Thus, by having two separate time difference estimates between two pairs of sites, a distinct location may be found, as shown by the intersection of lines 120 and 122. Likewise, angle of arrival information may be used alone or in combination with the time measurements to find a subscriber's location.

Angle of arrival measurements may be made with sectorized antenna methods, such as shown in FIG. 2, or with a fixed beam array antenna, as shown in FIG. 3. Such fixed beam array antennas can form very narrow beams, which allows the angle of arrival to be determined with a much higher resolution. Further, with other methods known in the art, such as adaptive beam forming and direction finding, even greater resolution may be obtained in determining the angle of arrival of a received signal.

Referring now to FIG. 3, a set of antenna elements 130 is shown. Each antenna is connected to an input (4 inputs in this example) of a Butler Matrix. A Butler Matrix is commonly known in the art. Its function is to combine the inputs from the four antenna elements with the proper amplitudes and phases, to produce the effect of four distinct sector antennas pointing in four distinct directions. This technique may be referred to as "beam forming." Outputs 132 represent the signals that would be received by the four "beam formed" sector antennas. Thus, when used in a location finding system, the four different beams may provide a way to estimate the direction of an arriving signal by detecting the beam which had the first arrival of the received signal. In like fashion, FIG. 2 illustrates the use of fixed beam sectorized antennas arranged in different pointing directions. Antennas 134, 136, and 138 each point in a different direction, and by monitoring the signal level at their respective outputs, 140, 142, and 144, an estimate of the direction of arrival may be obtained as mentioned above.

All of the location-finding methods that rely on time difference of arrival and or angle of arrival attempt to estimate the location of the subscriber by assuming a clear path from the subscriber to the base. With such a clear path, it is assumed that the signals propagate in a straight line, the time delay of the propagation is directly a function of the distance traveled, and the angle of arrival 110, 112, and 114 represents the direction, in a straight line, from the base to the subscriber.

When operating in a cluttered urban area, these assumptions create significant problems. In the cluttered urban area, the signals Typically do not propagate in a straight line; rather they are reflected off buildings, and diffracted around corners to reach the base station antenna via an indirect path. For example, see paths 172–180 in FIG. 2. If "clear path" assumptions are used, the location estimate will probably be invalid since both the time differences and angles are affected by the environment. Thus, the problem of location finding in a cluttered area is complicated because there is no straight forward relationship between the receive signal and the location of the subscriber.

Therefore, there remains a need for an improved, cost-efficient approach for locating subscribers in a cluttered area of a communications system, wherein indirect or non-line-of-sight propagation signal paths are taken into account, and signal characteristics need not be empirically measured.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1 illustrates a prior art time difference of arrival method of locating a subscriber in a non-cluttered area;

FIG. 2 depicts a set of sectorized antennas in accordance with the prior art;

FIG. 3 illustrates a narrow beam antenna array known in the prior art;

FIG. 4 shows a signal strength versus time delay profile, in accordance with the prior art;

FIG. 7 is a table of data that characterizes received signals in accordance with the method and system of the present invention;

DETAILED DESCRIPTION OF THE INVENTION

Figure 5:
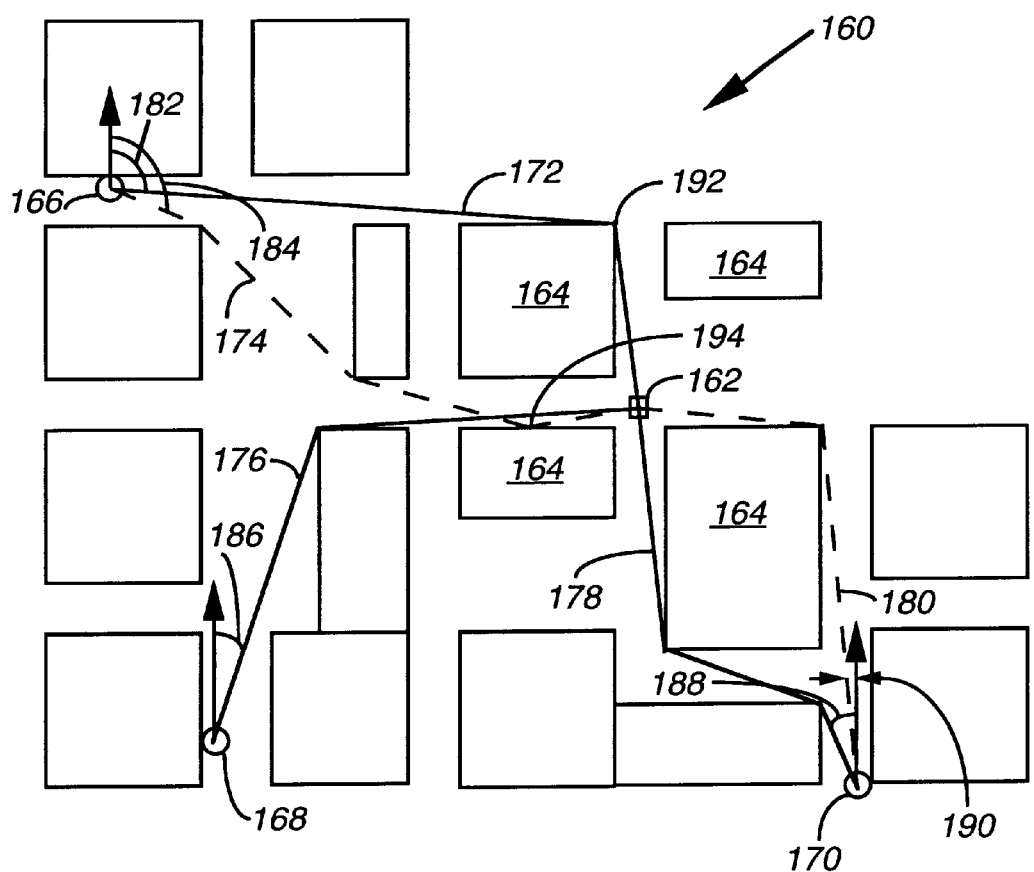
FIG. 5 illustrates radio frequency signal propagation in a cluttered wireless communications system service area in accordance with the method and system of the present invention.

Referring now to FIG. 5, there is depicted a model of a wireless communications system 160 in a dense urban area. As illustrated, subscriber unit 162 is located near buildings 164 in a downtown area, or other dense urban area. Base station antennas 166, 168, and 170 are located so that they may receive radio signals from subscriber 162.

Examples of radio signal propagation paths between subscriber 162 and base station antennas 166–170 are shown as paths 172–180. As signals are received at base station antennas 166–170, each has an associated angle of arrival 182–190.

It should be evident from paths 172, 176, and 178 that angles of arrival 182, 186, and 188 do not necessarily point in the direction of subscriber unit 162. Likewise, it should be evident that a time difference of arrival measurement, as described above, would no longer represent a smooth hyperbolic contour of possible locations that represent a constant time difference between base sites. This is because the time difference in the urban environment is a function of the length of a specific indirect path, wherein signals following such an indirect path either reflect or diffract off of buildings. Such reflections and diffractions may change as a function of the subscriber's location. Furthermore, small changes in the subscriber's location may dramatically change the characteristics of the received signals in ways that are not apparent to a receiver using "clear path" rules for location finding. These changing signal characteristics include: propagation delay or time of flight (TOF), the angle of arrival (AOA), signal magnitude of the signal received at the base, the difference between magnitudes of signals measured at pairs of base sites, and the time difference of arrival (TDOA) measured between base site antennas. In the dense urban area there is no longer a simple function that relates the measured characteristic—such as angle of arrival, time difference of arrival, received signal strength difference (RSSD), or an estimate of the path loss—to the actual direction or distance from one or more base stations.

In FIG. 5 the signal paths between the subscriber and the base stations that represent the shortest paths, that is, the first arrival of the signal energy in time, are illustrated by paths 172, 176, and 178, which are shown with solid lines. Additional paths, such as paths 174 and 180 shown with dashed lines, travel further. These additional paths are longer and thus have more time delay than the first-arriving paths.

With reference now to FIG. 4, there is depicted a power delay profile 148. This is a profile in time wherein the signal magnitude is plotted as a function of time. Note that in this case the first-arriving signal or ray is shown by the first peak 150. This ray is also the strongest ray in this example. Secondary rays are also evident, as shown at peaks 152 and 154. In a location finding system, the first-arriving ray is the ray which has traveled the shortest path. Most location systems make use of this ray in the calculation of time and angle of arrival parameters. However, the present invention may use all rays, including secondary rays, in its location-finding calculations.

The example of FIG. 5 illustrates a very dense, high-rise environment where practically all signal propagation paths are reflected down the streets and diffracted around corners. For example, path 174 includes a reflection 194 off of the side of a building 164. If shorter buildings are present, and taller base sites are used, many of the signal paths would travel over the rooftops of some buildings. This is not seen in this example, but by using three-dimensional predictions, over rooftop paths can also be used in location-finding calculations.

Figure 6:
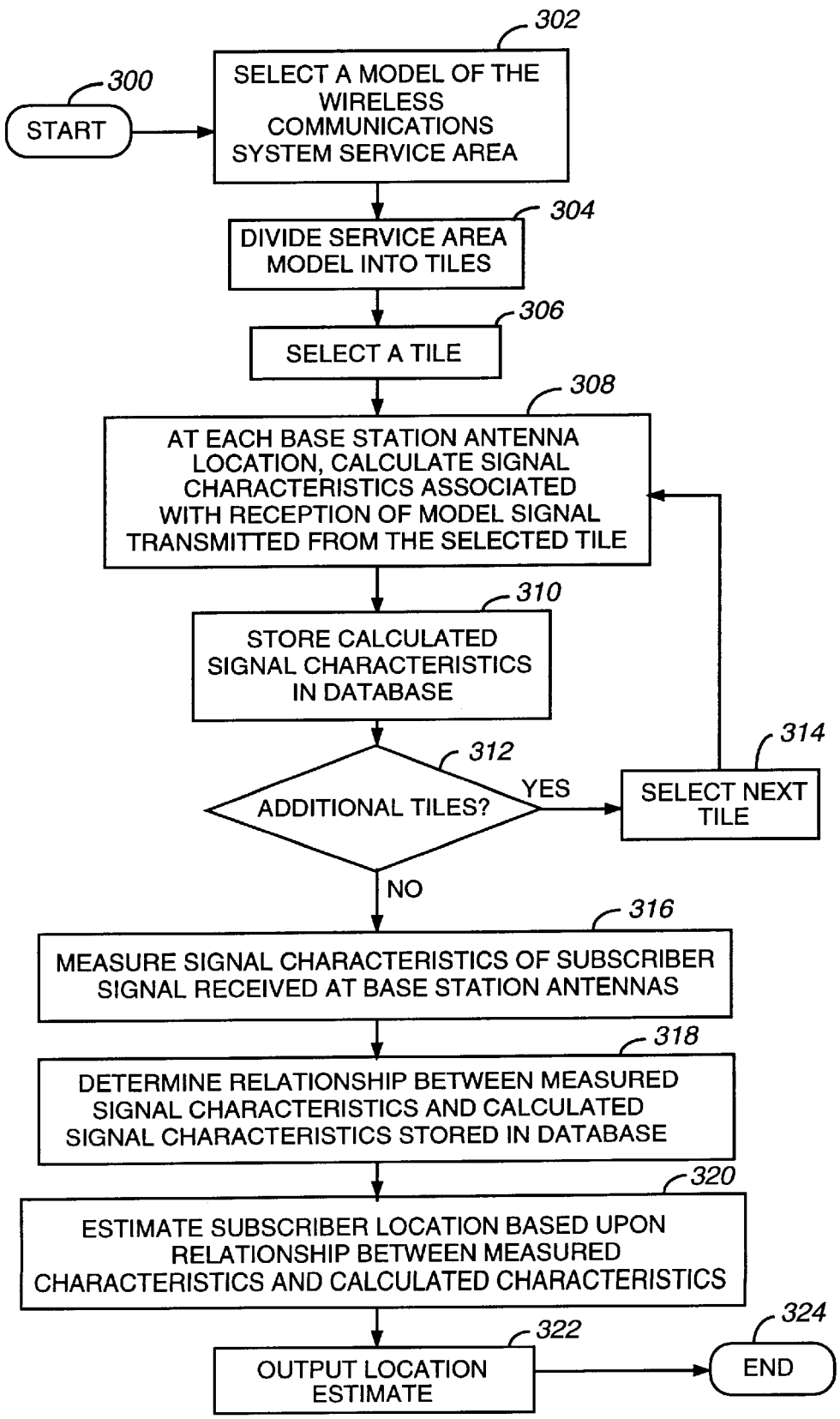
FIG. 6 is a logic flowchart that illustrates the method and operation of estimating the location of a subscriber in a wireless communications system in accordance with the method and system of the present invention.

With reference now to FIG. 6, there is depicted a logic flowchart that illustrates the method and operation of estimating the location of a subscriber unit in a wireless communications system in accordance with the method and system of the present invention. As illustrated, the process begins at block 300, and thereafter passes to block 302 wherein a model of the wireless communications system service area is selected. In one embodiment of the present invention such a model is a two-dimensional representation of buildings and other structures that may reflect, diffract, or otherwise affect a radio frequency signal transmitted by a subscriber unit. Additionally, such a model includes the location of base station antennas in the service area. An example of such a model is shown in FIG. 5, wherein buildings 164 are located relative to one another, and base station antennas 166–170 are also located relative to buildings 164.

Next, the process divides the service area model into tiles, as illustrated at block 304. Such tiles represent a small area in the service area, such as a 5 meter by 5 meter square. The size of the tile depends upon the required resolution of the location estimate. Rough location estimates having a lower resolution may be made using larger tiles; more accurate, higher resolution location estimates may be made using smaller tiles.

Next, the process selects a first tile, as depicted at block 306. Using this first tile, the process calculates signal characteristics associated with the reception of a model signal transmitted by a subscriber unit located in the selected tile, as illustrated at block 308. Such signal characteristic calculations are made for signals received at each base station antenna located in the model. These signal characteristic calculations are preferably made using known ray-tracing techniques that model reflections and diffractions of propagating radio frequency signals. Such signal characteristics calculated at each base station antenna location may include angle of arrival (AOA), time of flight (TOF) and received signal strength (RSS). For some tiles, it may be determined that a subscriber signal cannot be received at a particular base station because the signal is reflected or otherwise attenuated. If calculations indicate that more than one base station antenna can receive the subscriber's signal, other data may be calculated, such as time difference of arrival (TDOA) between pairs of receiving antennas and received signal strength difference (RSSD) between pairs of receiving antennas.

Received signal strength is directly related to the power level of the subscriber's transmit signal. Measurements of received signal strength can be scaled if the subscriber's transmit power is set to a value different than a nominal value. In most cases, the subscriber's power level is known by base station controller 418, and can be used to adjust the values of the measured signals. In cases where the base station controller does not know the value of the subscriber's power level, a relative receive signal strength must be used. This is done by calculating the difference between received signal levels at pairs of bases, in a manner similar to the calculation of time difference of arrival. By using this difference method, the absolute transmit level is not needed.

Time of flight is described in the preferred embodiment as a possible input parameter and included in database 208, FIG. 7. In some systems, time of flight is difficult to measure, and therefore time difference of arrival is used since an absolute reference is not needed for this measurement. Thus TOF may not be needed in 208, except for use in calculating the TDOA values.

In addition to calculating signal characteristics of a first-received model signal, the process may also calculate signal characteristics for a later-received model signal. Such later-received signals follow other, longer paths before reaching the base antenna.

Next, the process stores the calculated signal characteristics in a database, as depicted at block 310. An example of the structure of such database is shown in FIG. 7. As illustrated in FIG. 7, each record 210 is associated with a tile in model 160 (see FIG. 5). A tile may be associated with more than one record because characteristics of later-arriving signals from that tile may also be recorded in database 208.

In the example shown in FIG. 7, fields 212 are associated with a first base station antenna location, such as base station antenna 166 (see FIG. 5). Fields 214 are associated with a second base station antenna, such as base station antenna 168 (also in FIG. 5). Fields associated with each antenna location may include: time of flight (TOF), measured in microseconds; angle of arrival (AOA), measured in degrees; and received signal strength (RSS), measured in decibels referenced to 1 milliwatt (dBm).

As mentioned above, if it is determined by calculation that more than one base station antenna may receive a model signal transmitted from a selected tile, a time difference of arrival and a received signal strength difference and may also be calculated, as shown in fields 216 and 218. Similar data for other base station antenna locations may be stored in additional fields 220.

Returning now to FIG. 6, the process next determines if there are additional tiles to be used in calculating signal characteristics, as illustrated at block 312. If there are additional tiles to be used in signal characteristic calculation, the process selects a next tile, as depicted at block 314, and then iteratively returns to block 308 to perform such calculations.

If all the tiles have been used to calculate signal characteristics, the process next measures actual signal characteristics of a subscriber signal received at the base station antennas, as illustrated at block 316. The measured characteristics preferably include signal characteristics similar to those stored in database 208. In this example, the measured characteristics include: time of flight (TOF), angle of arrival (AOA), and received signal strength (RSS). If a signal is measured at more than one base station antenna, a time difference of arrival (TDOA) and a received signal strength difference (RSSD) may be calculated for pairs of base station antennas receiving the subscriber's signal. Signal characteristics may be measured for signals other than the first-arriving signal at each base station antenna. In a preferred embodiment, such signal characteristic measurements are made with an antenna array. Such an antenna array may be either a fixed beam array or an adaptive beam array. An adaptive beam antenna array can provide the most accurate direction of arrival measurement. Using a fixed beam array, direction of arrival may be determined by examining the proportional relation of received signal strengths over the various beams.

Signal characteristic measurements may also be made using sectorized antennas, wherein the angle of arrival is estimated in a manner similar to that performed in the fixed beamed antenna array.

While sectorized antennas or antenna arrays are preferred, the present invention may be implemented with omnidirectional base station antennas. If omnidirectional antennas are used, the number of calculated and measured signal characteristics should be sufficient enough to uniquely describe a signal transmitted from every tile in the service area. In order to calculate and measure a sufficient amount of data, calculations and measurements for additional base stations may be used. For example, measurements and calculations relating to base stations somewhat removed from the urban area may be used to uniquely identify signals transmitted from a selected tile. Thus, by including calculations and measurements for additional base stations, the values in the record associated with each tile will be different from the values in records associated with every other tile in the service area.

After taking signal characteristic measurements, the process determines a relationship between the measured signal characteristics and the calculated signal characteristics stored in the database, as depicted at block 318. In a preferred embodiment, such a relationship is a root mean square (RMS) error relationship, which is calculated by the following formula:

$$RMS\_error = \sqrt{\sum_{n=1}^{m-1}\sum_{i=n+1}^{m} A_{n,i}(TDOA_{n,i} - p\_TDOA_{n,i})^2 + \sum_{n=1}^{m} B_n(AOA_n - p\_AOA_n)^2 + \sum_{n=1}^{m-1}\sum_{i=n+1}^{m} C_{n,i}(P_{n,i} - p\_P_{n,i})^2 + \cdots}$$

where $A_{n,i}$, $B_n$, $C_{n,i}$, are weighting function coefficients, which may be specified by base site, and m is the total number of base sites in the service area;

$TODA_{i,j}$ is the calculated time difference of arrival between base i and base j;

$p\_TODA_{i,j}$ is the predicted value of the time difference of arrival between base i and base j, for a given tile;

$AOA_n$ is the measured angle of arrival at base site n;

$p\_AOA_n$ is the predicted angle of arrival at base site n for a given tile;

$P_{n,i}$ is a parameter representing the measured received signal strength difference (RSSD) between received signal strengths (RSS) at base i and base j;

$p\_P_{n,i}$ is a parameter representing the predicted received signal strength difference (RSSD) between received signal strengths (RSS) at base i and base j; and $A_{n,i}$, $B_n$, $C_{n,i}$, are coefficients used as weighting functions so that the accuracy and sensitivity of each of the parameters can be adjusted to give the most accurate and robust performance for the RMS error parameter calculation. These coefficients are specified as a function of the base site by the user, so that base site specific factors can be adjusted both in a relative and an absolute sense. These weighting factors may also be specified as a function of a particular title, so that base station antenna specific factors can be adjusted both for the entire cell and for a particular tile.

If calculated data regarding later-arriving rays are included in database 208, and if signal measurements of such later-arriving rays are made at the base station antennas, the step of determining a relationship between measured signal characteristics and calculated signal characteristics may take into account such later-arriving rays. For example, the RMS error calculation may include separate terms for calculated and measured later-arriving rays. The analysis of the later-arriving rays may also be weighted by appropriate weighting coefficients so that such rays are appropriately considered in the analysis.

Next, the process estimates the subscriber location based upon the relationship between the measured characteristics and the calculated characteristics, as illustrated at block 320. In a preferred embodiment, the location estimate corresponds to the location of the tile having the lowest RMS error, as determined in block 318. Thus, the estimated subscriber location is the x-y coordinate of the tile that has the lowest RMS error relationship with the measured subscriber signal.

Finally, the location estimate is output, which may include printing or displaying the estimate on a computer screen, as depicted at block 322. Thereafter, the process terminates, as illustrated at block 324.

When estimating the subscriber location as shown in block 320, the process may interpolate between records 210 (see FIG. 7) that have similar RMS error relationships with the measured signal. Such interpolation may improve the x-y coordinate estimate, and thereby provide an estimate with a greater resolution.

The estimating step shown in block 320 may further include an averaging function which may average several sequential location estimates together in order to reduce spurious effects of noise.

In order to improve calculated signal characteristics calculated according to block 308, actual signal measurements of signals transmitted from known locations may be used to improve the method of calculating the calculated signal characteristics. For example, an actual measurement may determine that a base station antenna consistently measures an angle of arrival with a 5 degree error. This error may be taken into account and compensated for during the calculation process. Actual measurements may also aid in making adjustments to the service area model so that the reflectivity of buildings and other parameters may be adjusted in the ray-tracer.

Signal characteristics may also be calculated using a trained neural network to predict signal characteristics of signals received from particular tiles. Such a neural network may be trained with actual signal measurements made in the service area. This method of calculating signal characteristics in a neural network may prove particularly important for service areas where environmental specifics needed by the ray-tracer are difficult to obtain, or where measurement validation techniques are difficult, such as inside buildings.

Figure 8:
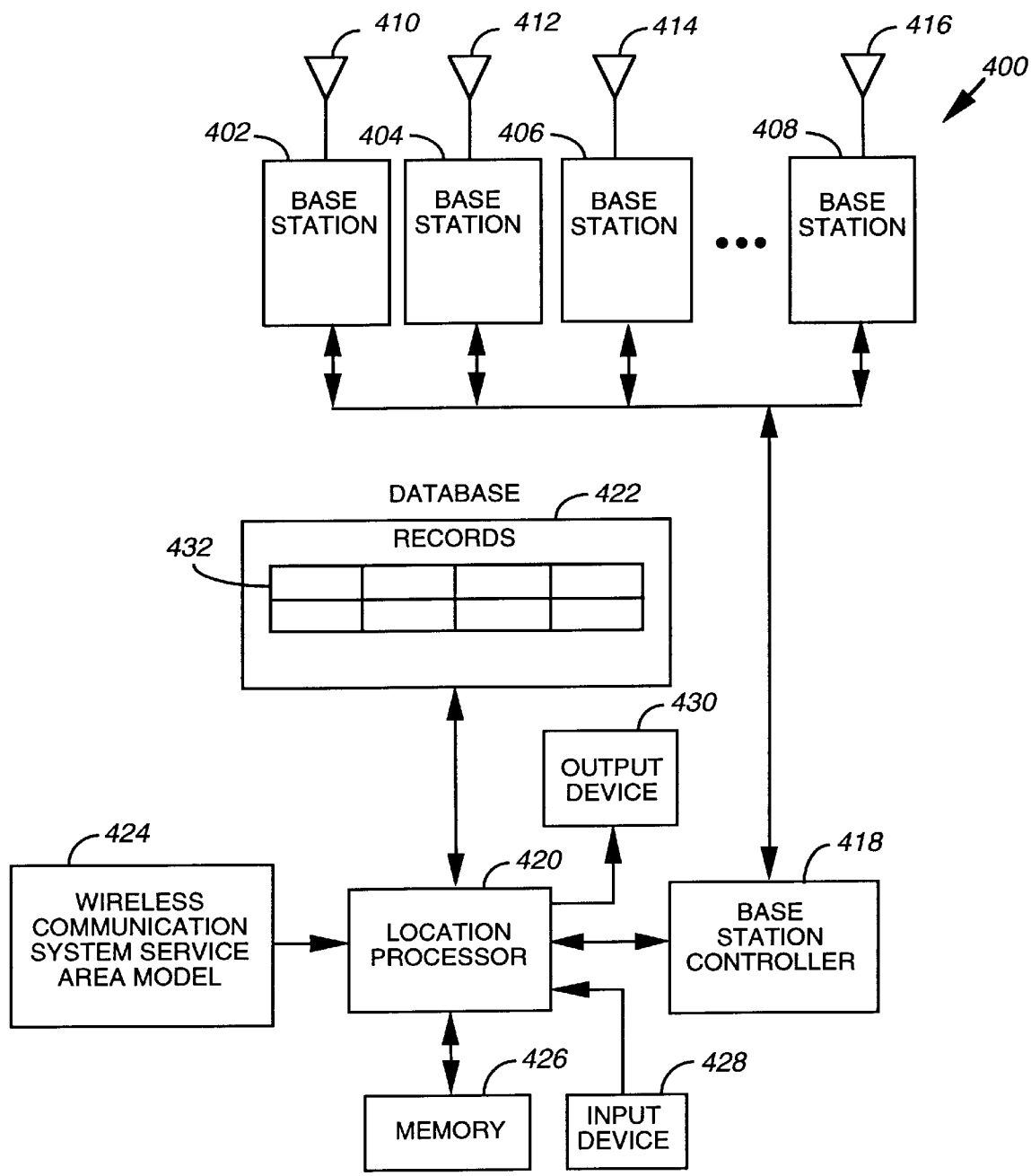
FIG. 8 is a high level block diagram of a system for estimating the location of a subscriber in accordance with the present invention.

With reference now to FIG. 8, there is depicted a high-level block diagram of a system for estimating a location of a subscriber unit in a wireless communication service area in accordance with the present invention. As illustrated, location system 400 includes base stations 402–408. Each base station 402–408 is coupled to a base station antenna 410–416, respectively. In a preferred embodiment of the present invention, antennas 410–416 are adapted to determine an angle of arrival of a radio frequency signal transmitted from a subscriber unit. Antenna systems having this capability include adaptive array antennas, which are able to form an antenna pattern that aids in the determination of the angle of arrival. Although some type of directional antenna is preferred, antennas 410–416 may also be implemented with omnidirectional antennas. Antennas 410–416 are typically evenly dispersed throughout the communication system coverage area in order to provide service over the entire area.

Base stations 402–408 are coupled to base station controller 418, which may be centrally located relative to base stations 402–408. Base station controller 418 is responsible for controlling base station operation, and other functions such as handoffs between base stations.

As an internal or external part of base station controller 418, location processor 420 is coupled to base station controller 418 for passing signal characteristic data and control data. Location processor 420 may be implemented with a general purpose data processing system, such as an HP 9000 Series 700 Model 735 workstation made by Hewlett-Packard Company, Palo Alto, Calif.

As illustrated, location processor 420 is coupled database 422, wireless communication system service area model 424, memory 426, input device 428, and output device 430. Database 422 is used for storing records of calculated signal characteristics which may be received at base station antennas throughout the service area. Database 422 is described more completely with reference to FIG. 7.

Wireless communication system service area model 424 includes data describing the location of buildings (and other objects affecting radio frequency propagation) and the location of base station antennas. This service area model 424 is used to predict signal propagation and calculate signal characteristics of a model signal transmitted from a selected tile and received at each base station antenna location.

Memory 426 may, among other things, be used to store weighting function coefficients, which may be used to adjust certain parameters in the signal characteristic calculation process.

Input device 428 is used to input data, weighting function coefficients, a service area model, or to update information regarding changes in the service area model. Input device 428 may be implemented with a disk drive unit, keyboard, or other means for in putting data.

Output device 430 is used to display the location estimate. Output device 430 may be implemented with a display, which displays the coordinates of the subscriber unit, and which may also display a map of the service area with an indication of the location of the subscriber unit.

Figure 9:
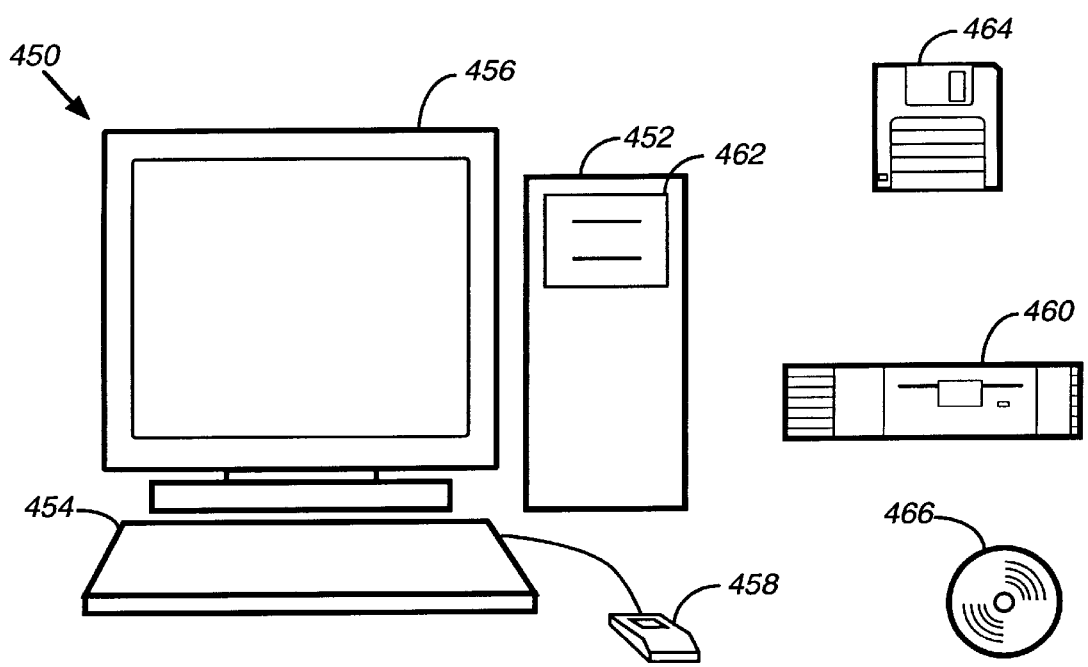
FIG. 9 depicts a data processing system, which may be used to implement an embodiment of the method and system of the present invention.

With reference now to FIG. 9, there is depicted a data processing system 450, which may be used to implement an embodiment of the method and system of the present invention. Data processing system 450 may include processor 452, keyboard 454, display 456, and pointing device 458. Keyboard 454 provides means for entering data and commands into processor 452. Display 456 may be implemented utilizing any known means for displaying textual, graphical, or video images, such as a cathode ray tube (CRT), a liquid crystal display (LCD), an electroluminescent panel, or the like. Pointing device 458 may be implemented utilizing any known pointing device, such as a trackball, joystick, touch sensitive tablet or screen, track pad, or as illustrated in FIG. 5, a mouse. Pointing device 458 may be utilized to move a pointer or a cursor on display 456.

Processor 452 may be coupled to one or more peripheral devices, such as CD-ROM 460.

Data processing system 450 includes means for reading data from a storage device. Such means for reading data may include: a hard disk drive internal or external to processor 452 (not shown); a tape drive (not shown); floppy disk drive 462, which reads and writes floppy disks 464; or CD-ROM 460, which reads and/or writes compact disk 466. Such storage means may be referred to as a computer usable medium for storing computer readable program code in the form of data and software.

Data processing system 450 may also be coupled to a network which permits the transfer of data and software between data processing systems. Using such a network, programs can be loaded into data processing system 450.

The components of data processing system 450 discussed above may each be implemented utilizing any one of several known off-the-shelf components. For example, data processing system 450 may be implemented utilizing any general purpose computer or so-called workstation, such as the workstation sold under the name "HP 9000 Series 700 Model 735" by Hewlett-Packard Company of Palo Alto, Calif.

In summary, the method and system of the present invention estimates the location of the subscriber unit in a wireless communications system service area. The present invention is especially useful for estimating location in a dense urban area, such as a downtown area including many high-rise buildings. Finding a subscriber location in a dense urban area involves careful analysis of indirect signals, wherein such an indirect signal has been reflected or diffracted, and does not travel in a straight path. Such indirect signals may not arrive from the direction of the transmitting subscriber unit. Additionally, such indirect signals have traveled a distance greater than the straight line distance between the subscriber unit and the base station antenna. Thus, both angle of arrival and time of flight erroneously indicate a location when "clear path" rules for determining location are used.

A further advantage of the present invention is that the data in the database is calculated rather than empirically measured. Empirical measure of such received signals is time consuming, costly, and subject to human error.

While the present invention has been described and illustrated with examples in a two-dimensional service area model, a three-dimensional service area model may also be used in order to determine a subscriber location in three dimensions. Using a three-dimensional model, a location system may be able to locate a subscriber at, say, the fifth floor of a building at Main and First streets.

A three-dimensional location system may be implemented using base stations having antennas that are adapted to measure a vertical angle of a received signal. Alternatively, base station antennas located at various heights above street level may be sampled so that angle of arrival and time measurements are three-dimensional in nature.

In data base 208 of a three-dimensional location-finding system, additional fields may be used to store such height or vertical angle information.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims and their equivalents, when interpreted in accordance with the breadth to which they are fairly, legally, and equitably entitled.

What is claimed is:

1. A method for estimating a location of a subscriber unit in a wireless communication system service area, comprising the steps of:

calculating a set of characteristics associated with the reception of a model signal, wherein the model signal represents a signal transmitted from a selected location to a receiver location in a model that represents the wireless communication system service area;

measuring a set of characteristics that describe a received signal at a receiver location in the wireless communication system service area, wherein the receiver location in the wireless communication system service area corresponds to the receiver location in the model;

determining a relationship between the calculated set of characteristics and the measured set of characteristics; and in response to the relationship between the calculated set of characteristics and the measured set of characteristics, estimating the location of the subscriber unit that transmitted the received signal.

2. The method for estimating a location according to claim 1 further including the step of adjusting the set of calculated characteristics in response to measuring a set of signal characteristics of a received signal transmitted from a known location in the wireless communication system service area.

3. The method for estimating a location according to claim 1 further including the step of adjusting the relationship between the calculated set of characteristics and the measured set of characteristics in response to measuring a set of signal characteristics of a received signal transmitted from a known location in the wireless communication system service area.

4. The method for estimating a location according to claim 1 wherein the step of calculating a set of characteristics associated with the reception of a model signal further includes the steps of:

estimating propagation paths using ray-tracing techniques; and calculating a set of characteristics associated with the reception of a model signal in response to the estimated propagation paths.

5. The method for estimating a location according to claim 1 further including the steps of:

calculating a second set of characteristics associated with reception of a second model signal at a second receiver location in the model that represents the wireless communication system;

measuring a second set of characteristics that describe a second received signal at a second receiver location in the wireless communication system service area, wherein the second receiver location in the wireless communication system service area corresponds to the second receiver location in the model;

determining a relationship between each calculated set of characteristics and each measured set of characteristics; and in response to the relationship between each calculated set of characteristics and each measured set of characteristics, estimating the location of the subscriber unit that transmitted the signal received at each receiver location.

6. The method for estimating a location according to claim 1 further including the steps of:

calculating a set of characteristics associated with reception of a second model signal at the receiver location, wherein a path of the second model signal is different from a path of the model signal;

measuring a second set of characteristics that describe a second received signal at the receiver location in the wireless communication system, wherein a path of the second received signal is different from a path of the received signal;

determining a relationship between each calculated set of characteristics and each measured set of characteristics; and in response to the relationship between each calculated set of characteristics and each measured set of characteristics, estimating the location of the subscriber unit that transmitted the signal and the second signal.

7. The method for estimating a location according to claim 1 wherein the calculated set of characteristics and the measured set of characteristics each include an angle of arrival of the received signal.

8. The method for estimating a location according to claim 1 wherein the calculated set of characteristics and the measured set of characteristics each include a time of flight of the received signal.

9. The method for estimating a location according to claim 1 wherein the calculated set of characteristics and the measured set of characteristics each include a received signal strength of the received signal.

10. The method for estimating a location according to claim 5 wherein the calculated set of characteristics and the measured set of characteristics each include a difference between time of flight at the receiver location and time of flight at the second receiver location.

11. A system for estimating a location of a subscriber unit in a wireless communication system service area comprising:

means for calculating a set of characteristics associated with the reception of a model signal, wherein the model signal represents a signal transmitted from a selected location to a receiver location in a model that represents the wireless communication system service area;

means for measuring a set of characteristics that describe a received signal at a receiver location in the wireless communication system service area, wherein the receiver location in the wireless communication system service area corresponds to the receiver location in the model;

means for determining a relationship between the calculated set of characteristics and the measured set of characteristics; and means for estimating the location of the subscriber unit that transmitted the received signal responsive to the relationship between the calculated set of characteristics and the measured set of characteristics.

12. The system for estimating a location according to claim 10 further including means for adjusting the set of calculated characteristics in response to measuring a set of signal characteristics of a received signal transmitted from a known location in the wireless communication system service area.

13. The system for estimating a location according to claim 10 further including means for adjusting the relationship between the calculated set of characteristics and the measured set of characteristics in response to measuring a set of signal characteristics of a received signal transmitted from a known location in the wireless communication system service area.

14. The system for estimating a location according to claim 10 wherein the means for calculating a set of characteristics associated with the reception of a model signal further includes:

means for estimating propagation paths using ray-tracing techniques; and means for calculating a set of characteristics associated with the reception of a model signal in response to the estimated propagation paths.

15. The system for estimating a location according to claim 10 further including:

means for calculating a second set of characteristics associated with reception of a second model signal at a second receiver location in the model that represents the wireless communication system;

means for measuring a second set of characteristics that describe a second received signal at a second receiver location in the wireless communication system service area, wherein the second receiver location in the wireless communication system service area corresponds to the second receiver location in the model;

means for determining a relationship between each calculated set of characteristics and each measured set of characteristics; and means for estimating the location of the subscriber unit that transmitted the signal received at each receiver location responsive to the relationship between each calculated set of characteristics and each measured set of characteristics.

16. The system for estimating a location according to claim 10 further including:

means for calculating a set of characteristics associated with reception of a second model signal at the receiver location, wherein a path of the second model signal is different from a path of the model signal;

means for measuring a second set of characteristics that describe a second received signal at the receiver location in the wireless communication system, wherein a path of the second received signal is different from a path of the received signal;

means for determining a relationship between each calculated set of characteristics and each measured set of characteristics; and means for estimating the location of the subscriber unit that transmitted the signal and the second signal responsive to the relationship between each calculated set of characteristics and each measured set of characteristics.

17. The system for estimating a location according to claim 10 wherein the calculated set of characteristics and the measured set of characteristics each include an angle of arrival of the received signal.

18. The system for estimating a location according to claim 10 wherein the calculated set of characteristics and the measured set of characteristics each include a time of flight of the received signal.

19. The system for estimating a location according to claim 10 wherein the calculated set of characteristics and the measured set of characteristics each include a received signal strength of the received signal.

20. The system for estimating a location according to claim 15 wherein the calculated set of characteristics and the measured set of characteristics each include a difference between time of flight at the receiver location and time of flight at the second receiver location.

21. A computer program product for estimating a location of a subscriber unit in a wireless communication system service area comprising:

a computer usable medium having computer readable program code means for calculating a set of characteristics associated with the reception of a model signal, wherein the model signal represents a signal transmitted from a selected location to a receiver location in a model that represents the wireless communication system service area;

a computer usable medium having computer readable program code means for measuring a set of characteristics that describe a received signal at a receiver location in the wireless communication system service area, wherein the receiver location in the wireless communication system service area corresponds to the receiver location in the model;

a computer usable medium having computer readable program code means for determining a relationship between the calculated set of characteristics and the measured set of characteristics; and a computer usable medium having computer readable program code means for estimating the location of the subscriber unit that transmitted the received signal responsive to the relationship between the calculated set of characteristics and the measured set of characteristics.

22. The computer program product for estimating a location according to claim 21 further including a computer usable medium having computer readable program code means for adjusting the set of calculated characteristics in response to measuring a set of signal characteristics of a received signal transmitted from a known location in the wireless communication system service area.

23. The computer program product for estimating a location according to claim 21 further including a computer usable medium having computer readable program code means for adjusting the relationship between the calculated set of characteristics and the measured set of characteristics in response to measuring a set of signal characteristics of a received signal transmitted from a known location in the wireless communication system service area.

24. The computer program product for estimating a location according to claim 21 wherein the computer usable medium having computer readable program code means for calculating a set of characteristics associated with the reception of a model signal further includes:

a computer usable medium having computer readable program code means for estimating propagation paths using ray-tracing techniques; and a computer usable medium having computer readable program code means for calculating a set of characteristics associated with the reception of a model signal in response to the estimated propagation paths.

25. The computer program product for estimating a location according to claim 21 further including:

a computer usable medium having computer readable program code means for calculating a second set of characteristics associated with reception of a second model signal at a second receiver location in the model that represents the wireless communication system;

a computer usable medium having computer readable program code means for measuring a second set of characteristics that describe a second received signal at a second receiver location in the wireless communication system service area, wherein the second receiver location in the wireless communication system service area corresponds to the second receiver location in the model;

a computer usable medium having computer readable program code means for determining a relationship between each calculated set of characteristics and each measured set of characteristics; and a computer usable medium having computer readable program code means for estimating the location of the subscriber unit that transmitted the signal received at each receiver location responsive to the relationship between each calculated set of characteristics and each measured set of characteristics.

26. The computer program product for estimating a location according to claim 21 further including:

a computer usable medium having computer readable program code means for calculating a set of characteristics associated with reception of a second model signal at the receiver location, wherein a path of the second model signal is different from a path of the model signal;

a computer usable medium having computer readable program code means for measuring a second set of characteristics that describe a second received signal at the receiver location in the wireless communication system, wherein a path of the second received signal is different from a path of the received signal;

a computer usable medium having computer readable program code means for determining a relationship between each calculated set of characteristics and each measured set of characteristics; and a computer usable medium having computer readable program code means for estimating the location of the subscriber unit that transmitted the signal and the second signal responsive to the relationship between each calculated set of characteristics and each measured set of characteristics.

27. The computer program product for estimating a location according to claim 21 wherein the calculated set of characteristics and the measured set of characteristics each include an angle of arrival of the received signal.

28. The computer program product for estimating a location according to claim 21 wherein the calculated set of characteristics and the measured set of characteristics each include a time of flight of the received signal.

29. The computer program product for estimating a location according to claim 21 wherein the calculated set of characteristics and the measured set of characteristics each include a received signal strength of the received signal.

30. The computer program product for estimating a location according to claim 25 wherein the calculated set of characteristics and the measured set of characteristics each include a difference between time of flight at the receiver location and time of flight at the second receiver location.

* * * * *